United States Patent
Mittler et al.

(10) Patent No.: US 11,959,552 B2
(45) Date of Patent: Apr. 16, 2024

(54) PISTON RING SYSTEM FOR AN INTERNAL COMBUSTION ENGINE WITH DIRECT WATER INJECTION

(71) Applicant: FEDERAL-MOGUL BURSCHEID GMBH, Burscheid (DE)

(72) Inventors: Richard Mittler, Burscheid (DE); Fabian Ruch, Leverkusen (DE)

(73) Assignee: Federal-Mogul Burscheid GmbH, Burscheid (DE)

( * ) Notice: Subject to any disclaimer, the term of this patent is extended or adjusted under 35 U.S.C. 154(b) by 0 days.

(21) Appl. No.: 18/043,596

(22) PCT Filed: Jul. 29, 2021

(86) PCT No.: PCT/EP2021/071278
§ 371 (c)(1),
(2) Date: Mar. 1, 2023

(87) PCT Pub. No.: WO2022/048832
PCT Pub. Date: Mar. 10, 2022

(65) Prior Publication Data
US 2023/0272853 A1    Aug. 31, 2023

(30) Foreign Application Priority Data
Sep. 1, 2020 (DE) ............ 10 2020 122 862.7

(51) Int. Cl.
*F16J 9/10* (2006.01)
(52) U.S. Cl.
CPC ..................... *F16J 9/10* (2013.01)
(58) Field of Classification Search
CPC ........................................................ F16J 9/10
USPC ....................................................... 123/193.6
See application file for complete search history.

(56) References Cited

U.S. PATENT DOCUMENTS

| | | | |
|---|---|---|---|
| 1,560,307 A | 11/1925 | Peeler | |
| 1,585,422 A | 5/1926 | Seifert | |
| 3,095,204 A * | 6/1963 | Neely | F16J 9/22 277/456 |
| 8,353,267 B2 * | 1/2013 | Cha | F16J 9/00 123/193.6 |
| 10,113,643 B2 * | 10/2018 | Williams | F16J 9/20 |
| 10,495,225 B2 * | 12/2019 | Mittler | F16J 9/20 |
| 2008/0017162 A1 * | 1/2008 | Clever | F16J 9/26 123/193.6 |

FOREIGN PATENT DOCUMENTS

| | | |
|---|---|---|
| DE | 102009036240 A1 | 2/2011 |
| JP | H094711 A | 1/1997 |
| WO | 2017008948 A1 | 1/2017 |
| WO | 2017207323 A1 | 12/2017 |

* cited by examiner

*Primary Examiner* — Hai H Huynh
(74) *Attorney, Agent, or Firm* — Robert L. Stearns; Dickinson Wright PLLC

(57) ABSTRACT

A piston ring system for an internal combustion engine includes a first compression piston ring (2), a second compression piston ring (4), and an oil scraper piston ring (6). The first compression piston ring (2) has a first ring body (8) with a first upper ring flank (10), a first lower ring flank (12), a first ring inner side (14), a first ring outer side (16), as well as two first abutting surfaces. A first contact region (18) of the first ring body (8) is arranged with a cylinder running surface (20) above a first piston ring center (22). At least one first oil pocket (24) is arranged below the first contact region (18) in the circumferential direction. The second compression piston ring (4) having a second ring body (26) a second upper ring flank (28), a second lower ring flank (30), a second ring inner side (32), a second ring outer side (34), as well as two second abutting surfaces. A second contact region (36) of the second ring body (26) is arranged with the cylinder running surface (20) above or below a second piston ring center (38). At least one second oil pocket (40) is arranged below the second contact region (36) in the circumferential direction. The oil scraper piston ring (6) is formed in one piece, two pieces, or three pieces.

9 Claims, 2 Drawing Sheets

PISTON RING SYSTEM FOR AN INTERNAL COMBUSTION ENGINE WITH DIRECT WATER INJECTION

BACKGROUND

1. Technical Field

The present invention relates to a piston ring system for an internal combustion engine with direct water injection.

2. Related Art

Piston rings for internal combustion engines have to meet all demands on a dynamic sealing. They have to thereby withstand both thermal and chemical influences, in that they prevent gas passage from the combustion chamber into the crankcase, so that no gas pressure and engine power, respectively, is lost. They are to further prevent the passage of oil from the crankcase into the combustion chamber, distribute the oil on the cylinder wall, and ensure an accurately defined oil film thickness on the cylinder wall. Additional tasks of the piston rings are also stabilization of the piston movement, heat transfer (heat dissipation) from the piston to the cylinder.

In order to ensure long service live, operational safety, and cost effectiveness during the entire operating time, piston rings are to have a low frictional resistance and good resistance and wear-resistance against thermomechanical fatigue, chemical attacks, and hot corrosion.

For certain demands, piston rings are advantageously arranged in the piston. Such systems have the main tasks of sealing combustion gases, heat dissipation, as well as scraping off and distributing oil.

When sealing combustion gases, a gas passage of combustion gases between piston and cylinder wall into the crankcase is to be prevented. By design, piston ring sealing systems in internal combustion engines are thereby not 100% tight, so that small amounts of leakage gas always get past the piston rings into the crankcase. An excessive transfer of hot combustion gases past piston and cylinder wall, however, has to be avoided by all means. This would result in loss of performance, an increased heat supply into the components, and a loss of the lubricating effect, whereby the service life of the engine decreases.

During the heat dissipation, the majority of the heat absorbed by the piston during the combustion is discharged from the piston rings to the cylinder. In particular the sealing rings take over this task. Without this continuous heat dissipation of the piston rings, piston seizing would occur in the cylinder bore in a very short time. Piston rings thus have to have good contact with the cylinder wall at any time.

When scraping off and distributing oil, the oil is evenly distributed on the cylinder wall, preferably without oil film weakenings or oil film tears. Excess oil, in contrast, is scraped off and flows back into the crankcase.

The oil scrape-off is significant in particular in the case of internal combustion engines with direct water injection (DWI). Direct water injection means that for cooling purposes, water is injected directly into the cylinder in order to reduce the rising temperature in the internal combustion engine section in response to constantly increasing compression. Damaging engine knocking is prevented with this and an increase of the compression and of the charging pressure is possible. Because of the direct water injection, however, the oil film can be weakened or even tear, respectively, which results in an insufficient lubrication.

SUMMARY

It is the object to provide a piston ring system for an internal combustion engine with direct water injection, which supports the distribution of the available oil, is not adapted to very small amounts of oil, and thus prevents insufficient lubrication.

According to a first aspect, the invention relates to a piston ring system for an internal combustion engine, comprising a first compression piston ring, a second compression piston ring, and an oil scraper piston ring.

The first compression piston ring has a first ring body comprising a first upper ring flank, a first lower ring flank, a first ring inner side, a first ring outer side, as well as two first abutting surfaces. A first contact region of the first ring body is further arranged with a cylinder running surface above a first piston ring center, and at least one first oil pocket is arranged below the first contact region in the circumferential direction.

The second compression piston ring comprises a second ring body comprising a second upper ring flank, a second lower ring flank, a second ring inner side, a second ring outer side, as well as two second abutting surfaces. A second contact region of the second ring body is further arranged with the cylinder running surface above or below a second piston ring center, and at least one second oil pocket is arranged below the second contact region in the circumferential direction.

The oil scraper piston ring is formed in one piece, two pieces, or three pieces.

The advantage of the piston ring system lies in that the distribution of the available oil is supported, and is not adapted to very small amounts of oil. In spite of direct water injection into the piston, the oil film is thus not weakened or tears and insufficient lubrication does not occur.

In an advantageous embodiment of the piston ring system, a main contour of the compression piston rings describes a continuous curve, which connects the offset first oil pocket upper edge to the first contact region with a constant tangent, in order to ensure the hydrodynamic contact ratio over the entire running surface of the compression piston rings.

In a further advantageous embodiment of the piston ring system, the first contact region of the ring body is at 1-40%, preferably 5-20%, of the axial height of the upper run-out of the groove.

In a further advantageous embodiment of the piston ring system, the second contact region of the ring body is at 1-40%, preferably 5-20%, of the axial height of the upper run-out of the groove.

In an exemplary embodiment of the piston ring system, the first contact region of the first ring body is arranged with the cylinder running surface above the first piston ring center, preferably at a height of 75 to 95%, particularly preferably at a height of 80 to 90%. The cited height of the first ring body is thereby measured from the first lower ring flank. The total height of the first ring body thereby corresponds to the largest distance between the first upper ring flank and the first lower ring flank, measured in the axial direction. The advantage of such an arrangement of the first contact region of the first ring body with the cylinder running surface is a better shape adaptability because of reduced moments of inertia. The gas pressure is further reduced because of this arrangement in front of the piston ring, and the sealing effect improves because of the increased hydrodynamic contact pressure.

In another exemplary embodiment of the piston ring system, the second contact region of the second ring body is arranged with the cylinder running surface above the second piston ring center, preferably at a height of 75 to 95%, particular preferably at a height of 80 to 90%. The cited height of the second ring body is thereby measured from the second lower ring flank. The total height of the second ring body thereby corresponds to the largest distance between the second upper ring flank and the second lower ring flank, measured in the axial direction. The advantage of such an arrangement of the second contact region of the second ring body with the cylinder running surface is a smaller region at the piston ring above the second contact region, with which the gas pressure can engage during the power stroke. A radial abutting loss on the cylinder wall (collapse of the piston ring) is thus avoided and sealing effect is not lost.

In a further embodiment of the piston ring system, the second contact region of the second ring body is arranged with the cylinder running surface below the second piston ring center, preferably at a height of 25-45%, particularly preferably at a height of 30-40%. An arrangement of the second contact region of the second ring body with the cylinder running surface below the second piston ring center ensures that the piston ring is pushed away more strongly from the oil from the cylinder wall, and less oil is scraped off during the compression stroke and exhaust stroke of a four-stroke engine or during the compression/intake of a two-stroke engine.

In a further embodiment of the piston ring system, the first compression piston ring and the second compression piston ring have the same dimensions and cross sections. For the observation of the dimensions and cross sections, a cross sectional plane is spanned by an axis in the piston or piston ring axial direction, respectively, and an axis in the radial direction. Identical dimensions and cross sections of the first and second compression piston ring simplify the manufacture and also reduce costs.

In a further exemplary embodiment of the piston ring system, the at least one first oil pocket is divided into several sections in the circumferential direction. An even oil storage or oil distribution, respectively, without flow parts of the oil in the circumferential direction is thus ensured.

In an embodiment of the piston ring system, the at least one first oil pocket is divided into 20 to 30 sections.

In another exemplary embodiment of the piston ring system, the at least one second oil pocket is divided into several sections in the circumferential direction. An even oil storage or oil distribution, respectively, without flow parts of the oil in the circumferential direction is thus ensured. During the power stroke of a two-stroke engine or during the intake stroke, respectively, and power stroke of a four-stroke engine, a vortex is additionally created in the oil pocket by means of flow stream consistency, in order to interrupt hydrodynamic oil flow at high piston speeds.

In a further embodiment of the piston ring system, the at least one second oil pocket is divided into 20 to 30 sections.

In a further exemplary embodiment of the piston ring system, a radius of curvature of a running surface profile in the region of the first contact region corresponds to 2.5 to 5% of the value of the piston ring height in the cross section. The advantage of such a radius of curvature, viewed in the cross section of the first ring body, is an optimal abutment behavior of the piston ring on the running surface of the cylinder as a function of the piston ring height. As a result, wear on the groove flanks of the piston are reduced, which would result in a constantly increasing vertical clearance. Because of too much vertical clearance, the piston ring is not guided correctly in the groove, lifts more easily off the groove flank, oil can be pumped onto the ring inner side, the piston ring flutters, and the result is sealing loss. An excessive convexity would additionally be created on the running surface of the ring, which effects an oil film, which is too thick, as well as higher oil consumption.

In a further embodiment of the piston ring system, a radius of curvature of a running surface profile in the region of the second contact region is smaller than the radius of curvature of the first contact region in the cross section. Due to the fact that the radius of curvature of a running surface profile, viewed in the cross section of the second ring body, in the region of the second contact region is smaller than the radius of curvature of the first contact region, the second compression piston ring can support during the oil scrape-off, in order to provide an optimal amount of oil for the first compression piston ring.

In a further embodiment of the piston ring system, the ratio of the radial distance from a base of the first oil pocket to the first contact region and of the radial distance from the base of the first oil pocket to a first oil pocket upper edge, which is offset in the radial direction, is between 1.5 and 3, preferably between 2 and 2.5, in the cross section of the first ring body. The advantage of this geometry refers to the tribological properties of the surfaces of the piston ring and cylinder, which are move relative to one another. An optimal inflow into the oil pocket, outflow from the oil pocket, and also storage of the oil therein form an oil film, which has a sufficient thickness and does not tear in spite of direct water injection.

In a further embodiment of the piston ring system, the ratio of the radial distance from a base of the second oil pocket to the second contact region and of the radial distance from the base of the second oil pocket to a second oil pocket upper edge, which is offset in the radial direction, is between 1.5 and 4.5, preferably between 2.5 and 3.5, in the cross section of the second ring body. This geometry is advantageous with regard to friction, wear, and required lubrication of the surfaces of the piston ring and cylinder, which move relative to one another. An optimal inflow into the oil pocket, outflow from the oil pocket, and also storage of the oil therein form an oil film, which has a sufficient thickness and does not tear in spite of direct water injection. Starting at the second contact region, the running surface profile thereby has reduced oil flow because of an optimized profile, on which carbon can hardly deposit during the compression stroke and exhaust stroke of a four-stroke engine or during the compression/intake of a two-stroke engine.

It is preferred that the first compression piston ring is arranged on the combustion chamber side, the oil scraper piston ring is arranged on the crankcase side, and the second compression piston ring is arranged between the first compression piston ring and the oil scraper piston ring. It is further preferred that a first land height separates an installation space of the first compression piston ring and an installation space of the second compression piston ring in the axial direction, and a second land height separates the installation space of the second compression piston ring and an installation space of the oil scraper piston ring in the axial direction.

BRIEF DESCRIPTION OF THE DRAWINGS

Exemplary embodiments of the invention will be described in more detail below with reference to the figures on the basis of schematic illustrations, wherein.

DETAILED DESCRIPTION

Figure 1:
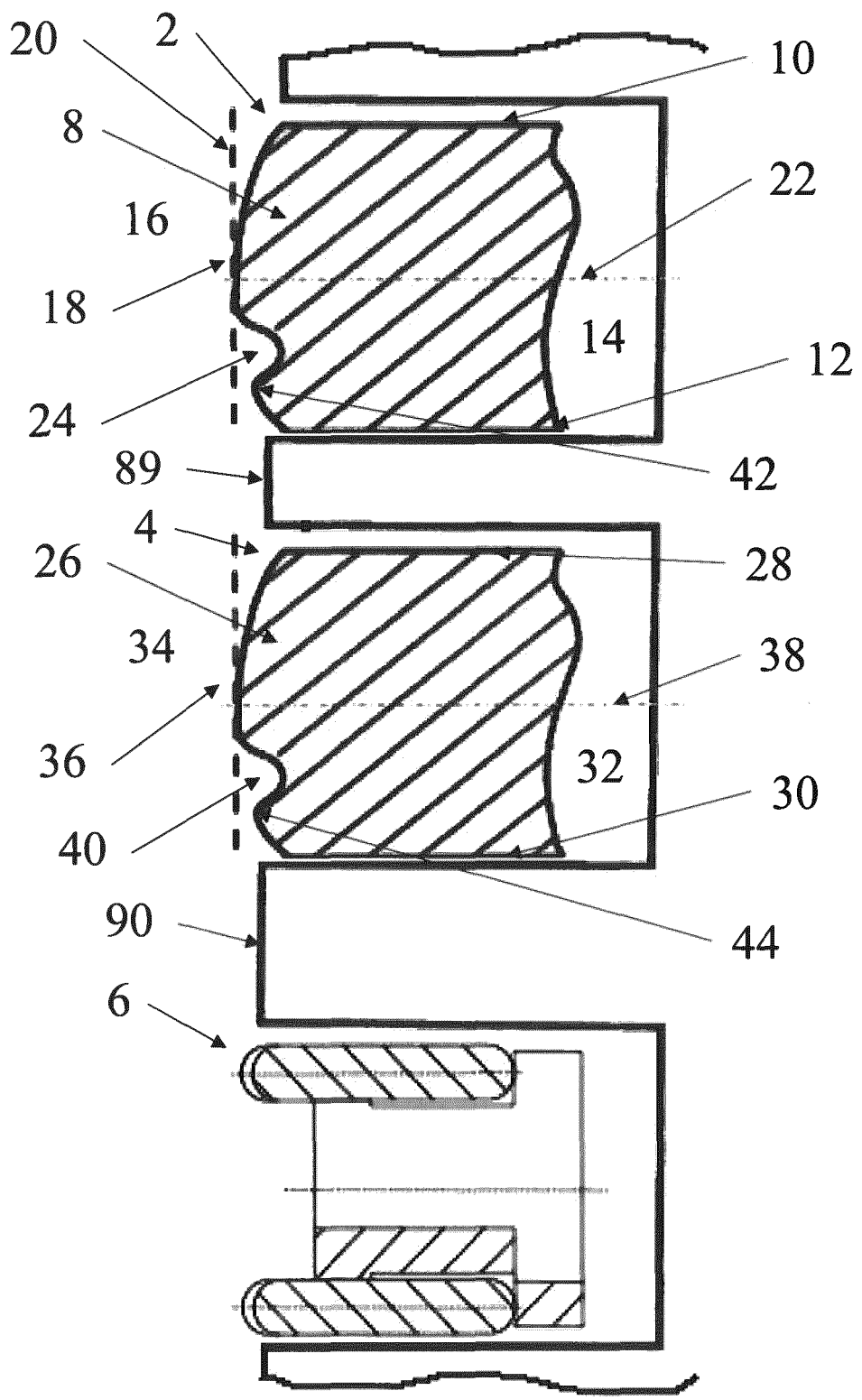
FIG. 1 shows a piston ring system according to an embodiment of the invention and FIG. 2 shows a compression piston ring main contour.

FIG. 1 shows a cross sectional view of a piston ring system. In said piston ring system, 3 grooves are arranged in a piston, wherein a first compression piston ring 2 is arranged in the uppermost groove, a second compression piston ring 4 is arranged in the middle groove, and an oil scraper piston ring 6, which is arranged below the other rings, namely at a distance from the second land height 90, is arranged in the lower groove. It is the main task of the compression piston rings 2, 4 to prevent the gas passage of combustion gases between piston and cylinder wall into the crankcase. It is the main task of the oil scraper piston ring 6 to seal between crankcase and combustion housing, and to regulate the oil film.

The first compression piston ring 2 has a first ring body 8 comprising a first upper ring flank 10, a first lower ring flank 12, a first ring inner side 14, and a first ring outer side 16. A first contact region 18 of the first ring body 8 comprising a cylinder running surface 20 is arranged above a first piston ring center 22. A first oil pocket 24 for storing oil is arranged below the first contact region 18, wherein said first oil pocket supports the regulation of the oil film on the cylinder running surface. The first contact region 18 is spaced apart farther away from a base of the upper piston groove in the radial radiation than a first grove upper edge 42.

The second compression piston ring 4 is located so as to sit below the first ring at a distance from the first land height 89 and has a second ring body 26 with a second upper ring flank 28, a second lower ring flank 30, a second ring inner side 32, and a second ring outer side 34. A second contact region 36 of the second ring body 26 with the cylinder running surface 20 is arranged above a second piston ring center 22 but can also be arranged below a second piston ring center 22. A second oil pocket 40 for storing oil is arranged below the second contact region 36, wherein said second oil pocket supports the regulation of the oil film on the cylinder running surface. The second contact region 36 is spaced apart farther away from a base of the middle piston groove in the radial direction than a second groove upper edge 44.

The oil scraper ring is made of three pieces, but can also be made of two pieces, and has two lamellae, which are pressed against the cylinder wall by means of a separation and expander spring.

The advantage of the piston ring system according to the invention is that the distribution of the available oil is improved, whereby an adaptation is not made to very small amounts of oil. In spite of the direct water injection into the piston, the oil film is thus not weakened and also does not tear. An insufficient lubrication is effectively avoided. The total height of the first ring body corresponds to the largest distance between the first upper ring flank and the first lower ring flank, measured in the axial direction. A better shape adaptability because of reduced moments of inertia is attained in the case of such an arrangement of the first contact region of the first ring body with the cylinder running surface. The gas pressure is further reduced by means of this arrangement in front of the piston ring, and the sealing effect is improved because of the increased hydrodynamic contact pressure.

Figure 2:
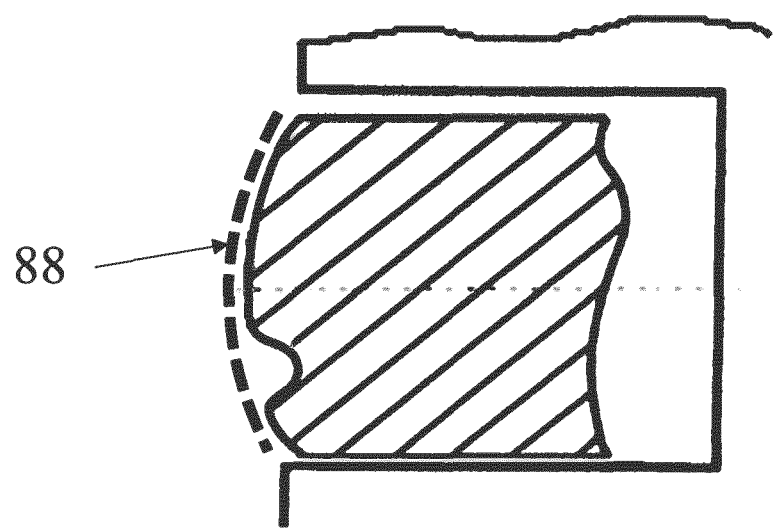

FIG. 2 shows a compression piston ring main contour, which describes a continuous curve, which connects the offset first oil pocket upper edge 42 to the first contact region 18 with a constant tangent.

The invention claimed is:

1. A piston ring system for an internal combustion engine, comprising
a first compression piston ring,
a second compression piston ring, which is configured to be located below the first compression piston ring, and
an oil scraper piston ring, which is configured to be arranged below the first and second compression rings,
wherein the first compression piston ring has
a first ring body comprising
a first upper ring flank,
a first lower ring flank,
a first ring inner side,
a first ring outer side, as well as
two first abutting surfaces,
wherein a first contact region of the first ring body is arranged with a cylinder running surface above a first piston ring center,
wherein at least one first oil pocket is arranged below the first contact region in the circumferential direction,
wherein the second compression piston ring comprises
a second ring body comprising
a second upper ring flank,
a second lower ring flank,
a second ring inner side,
a second ring outer side, as well as
two second abutting surfaces,
wherein a second contact region of the second ring body is arranged with the cylinder running surface above or below a second piston ring center,
wherein at least one second oil pocket is arranged below the second contact region in the circumferential direction, and wherein the at least one second oil pocket is divided into 20 to 30 sections in the circumferential direction, and
wherein the oil scraper piston ring is formed in one piece, two pieces, or three pieces.

2. The piston ring system according to claim 1, wherein a main contour of the compression piston rings describes a continuous curve, which connects the offset first oil pocket upper edge to the first contact region with a constant tangent, in order to ensure the hydrodynamic contact ratio over the entire running surface of the compression piston rings.

3. The piston ring system according to claim 1, wherein the first contact region of the ring body is at 1-40% of the axial height of the upper run-out of the groove.

4. The piston ring system according to claim 3, wherein the first contact region of the ring body is between 5-20% of the axial height of the upper run-out of the groove.

5. The piston ring system according to claim 1, wherein the second contact region of the ring body is at 1-40% of the axial height of the upper run-out of the groove.

6. The piston ring system according to claim 5, wherein the second contact region is between 5-20% of the height of the upper run-out of the groove.

7. The piston ring system for an internal combustion engine according to claim 1, wherein the second contact region of the second ring body is arranged with the cylinder running surface below the second piston ring center at a height of 25-45%.

8. The piston ring system according to claim 7, wherein the height is between 30-40%.

9. The piston ring system for an internal combustion engine according to claim 1,
  wherein the first compression piston ring is arranged on the combustion chamber side, the oil scraper piston ring is arranged on the crankcase side, and the second compression piston ring is arranged between the first compression piston ring and the oil scraper piston ring,
  wherein a first land height separates an installation space of the first compression piston ring and an installation space of the second compression piston ring in the axial direction, and a second land height separates the installation space of the second compression piston ring and an installation space of the oil scraper piston ring in the axial direction.

* * * * *